Inventor
Frederick F. Zeier

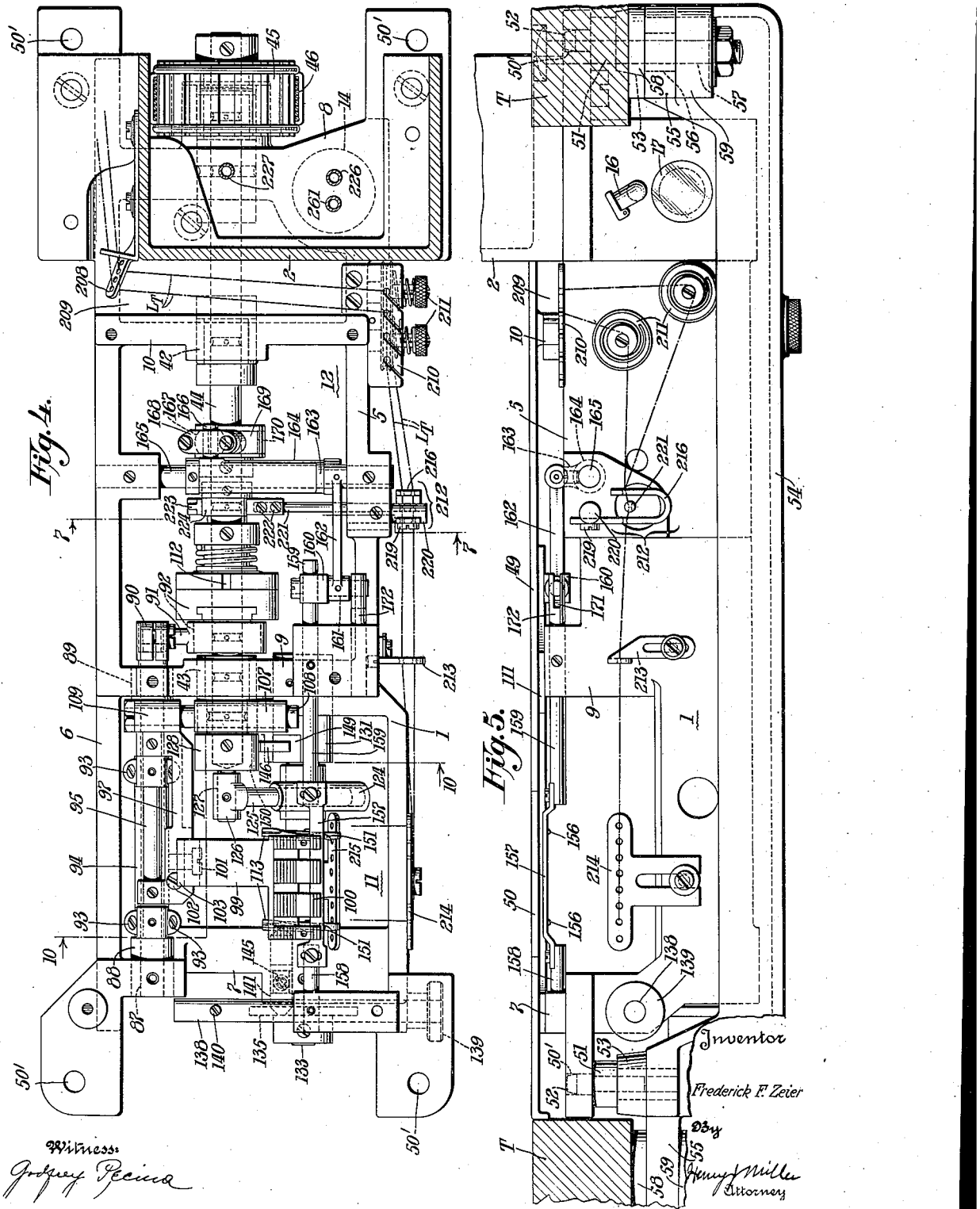

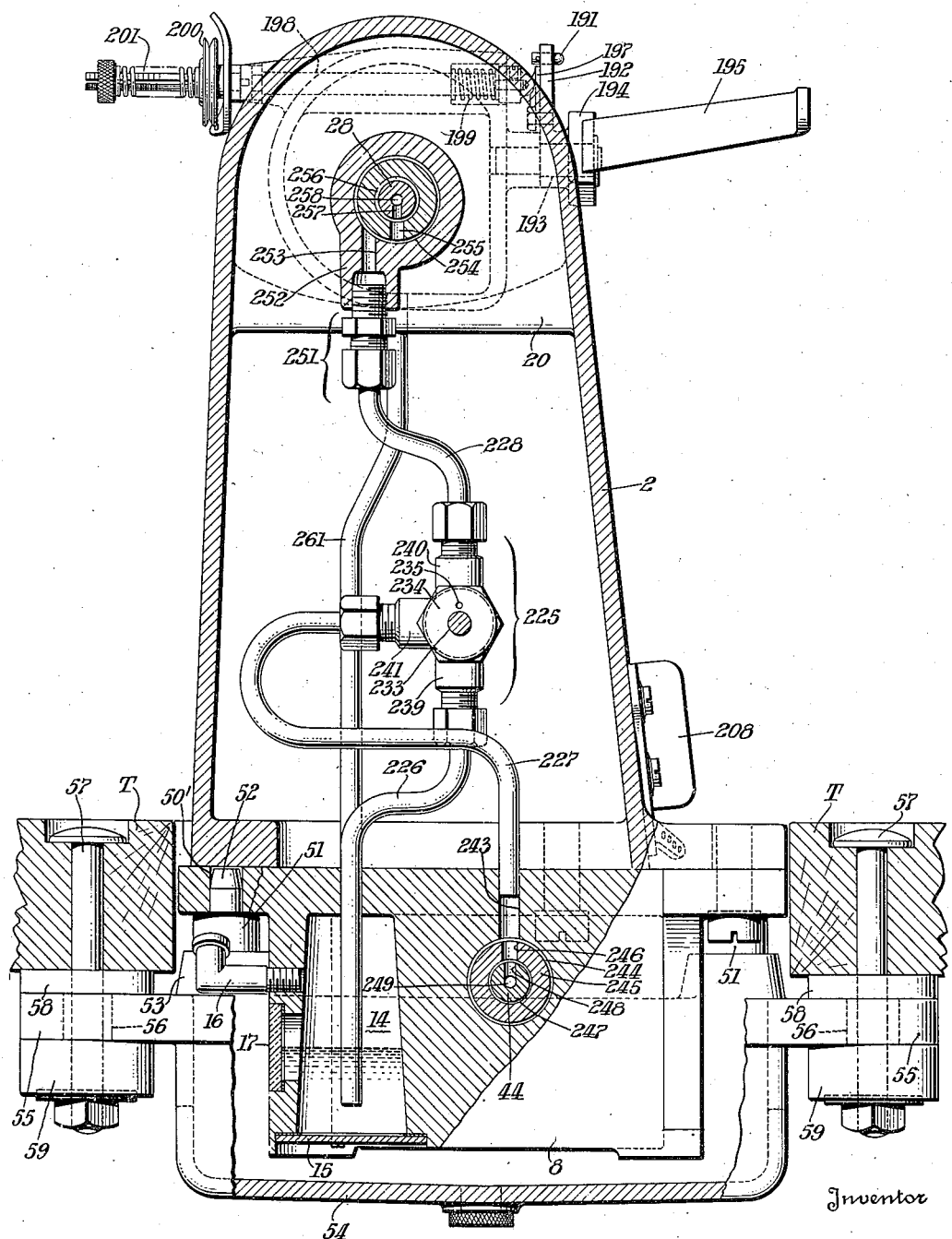

March 2 1943.    F. F. ZEIER    2,312,858
CHAIN-STITCH SEWING MACHINE
Filed Jan. 30, 1940    7 Sheets—Sheet 7

Inventor
Frederick F. Zeier
Witness:
By Henry J. Miller
Attorney

Patented Mar. 2, 1943

2,312,858

UNITED STATES PATENT OFFICE 2,312,858

CHAIN-STITCH SEWING MACHINE

Frederick F. Zeier, Fairfield, Conn., assignor to The Singer Manufacturing Company, Elizabeth, N. J., a corporation of New Jersey Application January 30, 1940, Serial No. 316,297

15 Claims. (Cl. 112—199)

This invention relates to sewing machines, more particularly of the needle-feed chain-stitch type, and has for an object to provide an organized sewing machine of the type in question having efficiently functioning mechanisms enabling it to be commercially operated at speeds in excess of 4000 stitches per minute, without undue wear and tear on the parts.

Another object of the present invention is the provision of an improved and simplified looper mechanism having means for shifting the looper from its normal operative position to a position forwardly of the stitching point where the looper thread-eye is convenient for threading.

A further object of the invention is to provide a novel latching device which is automatically operated during the retraction of the looper to lock the lower main-shaft of the machine against rotation until the looper is returned to its normal operative position.

These and other objects will, in part, be obvious and will, in part, be hereinafter more fully disclosed.

In the drawings, which show by way of illustration one embodiment of the invention:

Fig. 4 is a top plan view of the machine-bed with the standard of the machine-frame in section and the work-supporting plate removed from the bed to expose the mechanism within the same.

Fig. 5 is a front side elevation of the machine-bed and drip-pan, showing the manner in which the latter is suspended from the table structure and the resilient support of the machine-bed upon the drip-pan.

Fig. 6 is a transverse vertical sectional view through the standard of the machine, showing the preferred location of the lubricating pump and the inlet and outlet conduits therefor.

Figure 1:
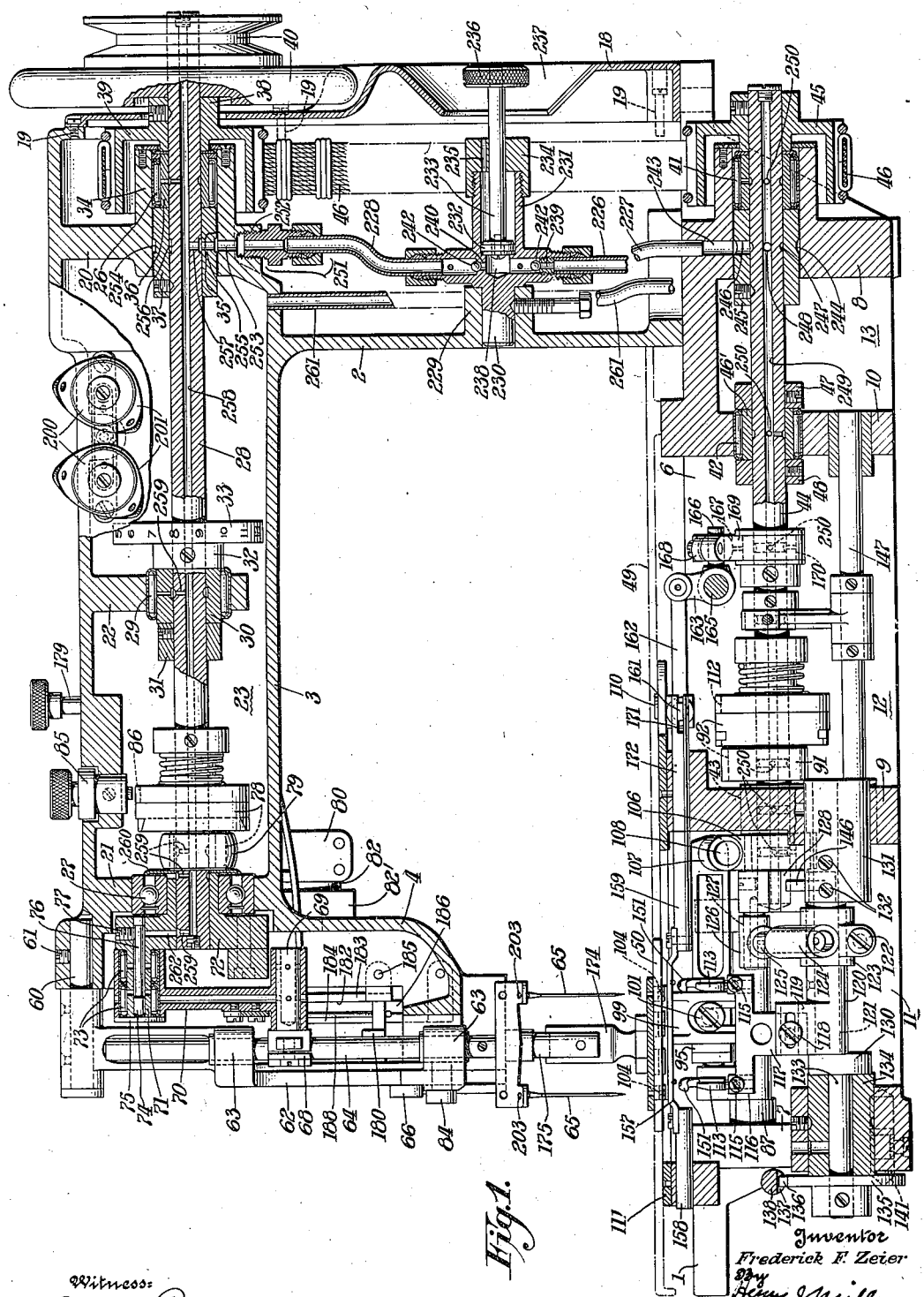
Fig. 1 is a vertical sectional view of a sewing machine, showing the inner workings thereof and more particularly the pressure lubricating system therefor.

The detailed description which follows is broken down into sections and each individual mechanism of the sewing machine will be discussed under the appropriate sub-title.

Frame and general structure

The hollow machine-frame, which is preferably cast in two sections, comprises a rectangular bed 1 from one end of which rises a standard 2 of an overhanging bracket-arm 3 terminating in a head 4.

The rectangular bed 1 (Fig. 4), is composed of vertically disposed front and rear walls 5 and 6, and end walls 7 and 8. Intermediate the end walls 7 and 8 are two transverse dividing walls 9 and 10 which separate the bed 1 into individual compartments 11, 12 and 13. Disposed in compartments 11 and 12 are the stitch-forming mechanism and the feeding mechanism, together with connections for actuating the same. Each of the three compartments 11, 12 and 13 is opened at the bottom to permit the precipitation of spent oil, lint and dirt from the mechanism within these compartments. The end wall 8 of the bed adjacent the front wall 5 is formed with an oil reservoir 14, see Figs. 4 and 6, closed at its lower end by means of a gasket-fitted plate 15 and adapted to be filled through an oil-cup 16 threaded into the side-wall of the reservoir 14. Secured also in the side-wall of the reservoir is a transparent window 17 through which the level of the oil in the reservoir may be observed.

Secured upon the rear end-portion of the bed 1 is the standard 2 of the bracket-arm 3 (Fig. 1), the open face of which standard is adapted to be closed by a cover-plate 18 secured by screws 19. Formed integral with the upper end of the standard 2 is the bracket-arm 3 provided at the standard end with an internal partition 20, at its head end with an internal partition 21 and intermediate the partitions 20 and 21 with a depending boss 22. The partitions 20 and 21 define a compartment 23 housing the actuating eccentric and the stitch-length indicating disk of the needle feeding mechanism. Access within the compartment 23 is gained by removal of the cover-plate 24 fastened by screws 25 to the rear of the bracket-arm 3. The partitions 20 and 21 provide supports for a commercial needle-bearing 26 and ball-bearing 27 in which is journaled the main or arm-shaft 28. To lend support to the arm-shaft and to prevent whipping thereof, the depending boss 22 is fitted with a second needle-bearing 29 embracing a sleeve 30 clamped to rotate with the main-shaft between a nipper actuating cam 31 and the hub 32 of a stitch-length indicating disk 33.

The internal partition 20, Fig. 1, is preferably formed with an elongated bearing boss 34 having a bore 35 snugly receiving the outer casing of the needle-bearing 26, which bearing embraces a sleeve 36 clamped upon the arm-shaft 28 to rotate therewith between a collar 37 and the inner end of the hub 38 of a belt-sprocket 39. Fixed upon the end of the arm-shaft 28 in face-to-face contact with the hub 38 of the belt-sprocket 39 is the usual belt-driven balance-wheel 40.

Longitudinally of the bed 1 there is journaled in needle-bearings 41, 42 and 43, the lower rotary main-shaft 44 having secured upon the inner end thereof a belt-sprocket 45 of the same diameter as the belt-sprocket 39. These two belt-sprockets 39 and 45 are connected together by means of a conventional clip-belt 46 to rotate at a ratio of one-to-one. It will be observed in Fig. 1 that the needle-bearing 41 supports the inner end-portion of the lower main-shaft 44 in a manner identical with that of the hereinbefore described mounting for the needle-bearing 26 on the arm-shaft 28 and, therefore, no further description of the mounting for the needle-bearing 41 is believed necessary. The needle-bearing 42 is located in the transverse wall 10 of the bed 1 and embraces a sleeve 46' clamped upon the lower main-shaft 44 to rotate therewith between two collars 47 and 48. Needle-bearing 43 is mounted in the transverse wall 9 of the bed 1 in a manner differing only from needle-bearing 42 in that the sleeve embraced by the needle-bearing is clamped between the feed-advance eccentric and the feed-lift eccentric, both of which are later described. The main-shaft 44 at its forward end-portion has secured thereto a plurality of eccentrics and a suitable crank for actuating the mechanism located within the bed 1.

Referring now to Figs. 1, 5 and 6, it will be seen that the bed 1 is provided with a detachably secured work-supporting plate 49 formed with a cut-out to receive the usual throat-plate 50. When the machine is mounted upon a table-structure the surface of the work-supporting plate 49 is adapted to be substantially flush with the table-top. This is accomplished by resting the four corners of the machine-bed 1, which are apertured as at 50', upon resilient pads 51, such as rubber, neoprene, or the like, fitted with locating pins 52 adapted to enter the apertures 50'. The resilient pads 51 are suitably fastened upon posts 53 rising from the side-walls of an open-topped box-like drip-pan 54. The drip-pan has preferably integral therewith three horizontally projecting lugs 55, two at the standard end of the machine and one centrally of the head end of the machine, apertured as at 56, to receive the lower ends of suspension bolts 57 depending from the table-top T. Interposed between the upper face of each of the lugs 55 and the table-top T is a resilient pad 58 and disposed between the lower face of each of the lugs and the nut on the suspension bolts 57 is a second resilient pad 59. The resilient pads 51, 58 and 59 are provided to dampen vibrations set up in the machine during high speed operation.

From the above description, it will be understood that a machine frame is provided in which all the mechanisms housed thereby are conveniently accessible for assembly and repair, and that the machine is supported in such a way upon the drip-pan 54 that vibrations in the machine are effectively dampened.

*Needle-bar mechanism*

Formed upon the free end of the bracket-arm 3 is the usual head 4 which is of substantially conventional form. Pivotally hung preferably upon a stud 60, see Figs. 1 and 2, secured by a screw 61 in the top of the head 4 is a vibratory frame 62 formed with two spaced lugs 63 in which is journaled, for endwise reciprocation, a needle-bar 64 carrying at its lower end needles 65. The lower end of the vibratory frame 62 is steadied in its movement in the line of feed by an L-shaped bracket 66 which is secured to the machine-head preferably by screws 67. Clamped upon the needle-bar 64 intermediate the lugs 63 is the usual split collar 68 having a hollow pin 69 connected by a tubular link 70 to a hollow crank-pin 71 integral with a crank 72 secured upon the end of the arm-shaft 28.

Referring particularly to Fig. 1, it will be seen that the upper end of the tubular link 70 is elongated to receive two needle-bearings 73, the rollers of which engage the crank-pin 71. To maintain the needle-bearings in place and the tubular link 70 upon the hollow crank-pin 71, there is provided in the bore of the latter a stud 74 having a relatively large head 75 and a reduced shank 76 engaged by the inner end of a set-screw 77 threaded into the crank 72. The stud 74, in addition to providing a convenient means for assembling the link 70 upon the crank-pin 71, also facilitates the distribution of lubricant from the bore of the arm-shaft to the bearing at the lower end of the tubular link 70. This feature will be described more in detail hereinafter under the section devoted to lubrication.

To assist in feeding the work through the machine, the needle is adapted to be vibrated in the line of feed in timed relation with the lower feeding element. The vibratory movement of the needle is derived from an adjustable eccentric 78 mounted upon the arm-shaft 28 through connections clearly disclosed in Figs. 2 and 3. Embracing the eccentric 78 is a short rearwardly extending pitman 79, the end of which is connected to the upper end of a vertically disposed rock-lever 80 clamped at its lower end upon the end of a rock-shaft 81 journaled in a bushing 82 fixed in the lug 82' on the rear wall of the head 4. Pinned, or otherwise secured, upon the other end of the rock-shaft 81 is the upper end of the depending lever 83 connected at its lower end by a horizontal link 84 to the lower end of the vibratory frame 62.

To provide for changing the amplitude of vibration of the needle, i. e., to change the length of stitch, provision must be made to permit adjustment of the amount of vibratory movement imparted to the needle. In the present case, the eccentric is constructed so that its eccentricity may be conveniently adjusted to give the desired stitch-length. The constructive features of the adjustable eccentric 78 used in the machine chosen for illustration need not herein be described, since the eccentric is disclosed and claimed in the United States patent to W. Myers, No. 2,128,031, issued Aug. 23, 1938. To assist in effecting adjustment of the eccentric 78, there is provided in the top of the bracket-arm 3 a detent 85 which is adapted to be depressed by the operator and to enter a suitable stop-notch 86 in the adjusting member of the eccentric 78, permitting the operator to turn the balance-wheel 40 and adjust the eccentricity of the eccentric. The structural details of the detent 85 will not be described in detail, since it is disclosed in the United States patent to W. Myers, No. 2,063,264, dated Dec. 8, 1936, but its operation in connection with the present arrangement will be more fully described later in this specification in connection with the lower four-motion feeding mechanism.

As described above, it will be understood that as the arm-shaft 28 is rotated the needle-bar 64 is reciprocated endwise and at the same time is vibrated in the line of feed by the eccentric 78 and the connections actuated thereby.

*Lower feeding mechanism*

The lower four-motion feeding mechanism, which operates in synchronism with the needle-feed, is best shown in Figs. 1, 3, 4 and 10. It comprises a feed-advance and -return rock-shaft 87 journaled in two bushings 88 and 89 fixed in the walls 7 and 9, respectively, of the bed 1. Clamped upon the inner end of the rock-shaft 87 is a depending rock-lever 90, the lower end of which is connected by a forwardly extending pitman 91 to an adjustable eccentric 92 upon the lower main-shaft 44. The elements of the eccentric 92 are identical with the eccentric 78 on the upper main-shaft previously referred to in the description of the needle-bar mechanism. Secured by screws 93 upon the outer end-portion of the rock-shaft 87 is the usual upstanding feed-rocker 94 freely journaled in its upper end a fulcrum-bar 95. Fixed upon the fulcrum-rod 95 by the set-screws 96 is the bifurcated end of a feed-bar 97 formed with a vertically disposed channel 98 (Fig. 10), adapted to receive the shank 99 of a forwardly extending feed-dog 100 clamped in vertically adjusted position by a screw 101 threaded into the feed-bar 97. The feed-dog 100 is maintained in its properly adjusted position by a screw 102 threaded into the feed-bar 97 and disposed beneath an offset 103 formed on the feed-bar. In order to eliminate bending of the needles during the feeding stroke, the feed-dog is formed with two needle-receiving apertures 104, the rear sides of which engage the blades of the needles 65 and back the same up during feeding of the work.

The rising-and-falling movements are imparted to the feed-dog 100 by an eccentric 105 secured upon the lower main-shaft 44 adjacent the dividing wall 9 of the bed 1. Embracing the eccentric 105 is a strap 106 having formed integral therewith a transverse sleeve 107 affording a socket in which is slidably fitted a pin 108 secured in a lug 109 cast integral with the inner end of the feed-bar 97. Rotation of the lower main-shaft 44 oscillates the feed-bar 97 through the pin-and-sleeve connection about the axis of the fulcrum-bar 95, thus raising and lowering the feed-dog 100 in timed relation with the advance-and-return movements imparted to the feed-dog by the eccentric 92.

Figure 3:
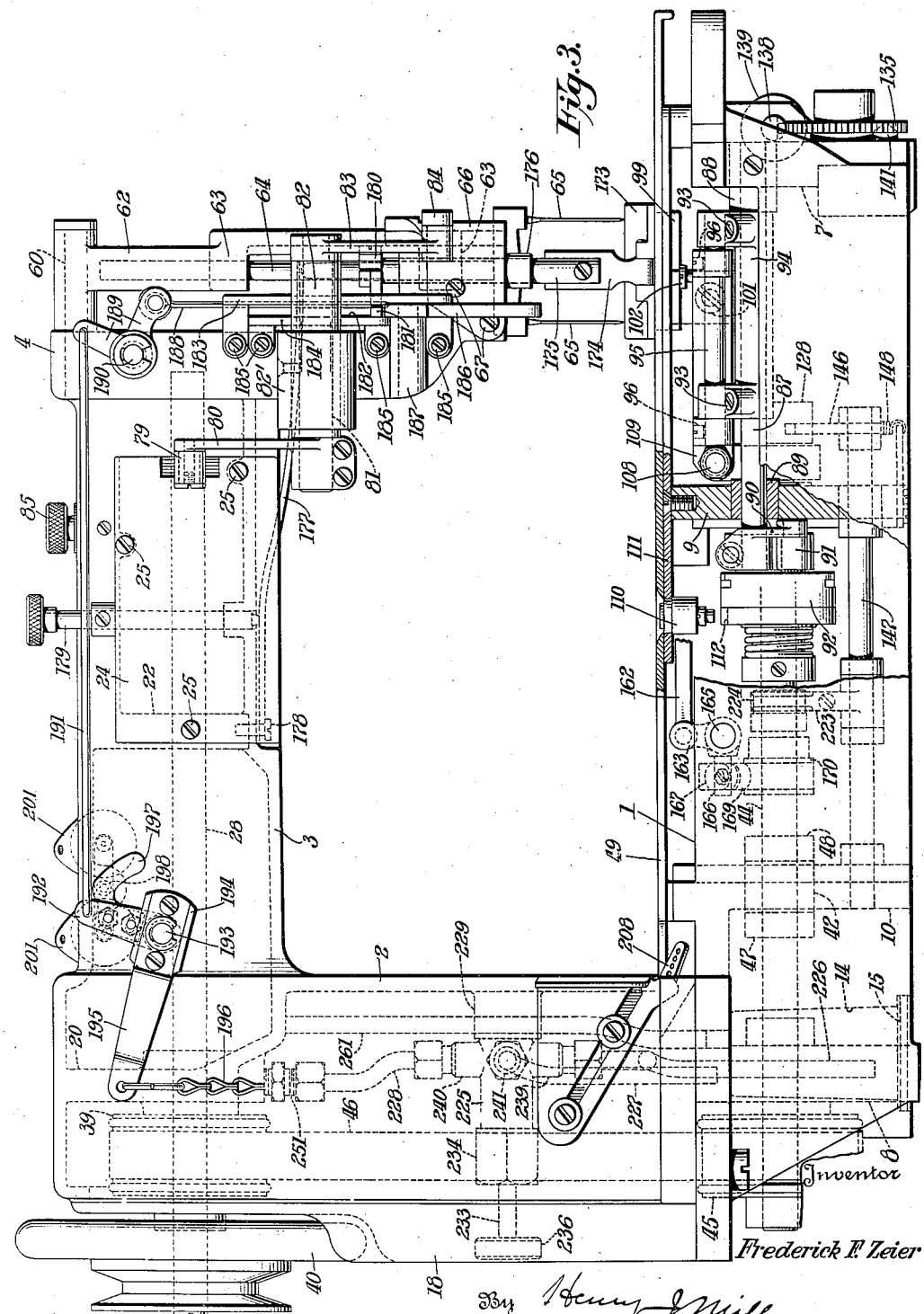
Fig. 3 is a rear side elevation of the sewing machine with a portion of the drip-pan broken away and the bed in section to illustrate the detent for assisting in adjusting the eccentricity of the feed-eccentric for the lower four-motion feeding mechanism.

In a machine having a needle-feed and a lower feeding mechanism, each deriving its work-advancing movements from independent adjustable eccentrics, means must be provided to enable the needle-feed and the lower feeding mechanism to remain in unison during the adjustment of the stitch-length. In Figs. 1 and 3, it will be observed that the adjusting element of the eccentric 92 is held stationary by means of a detent 110 provided in a plate 111 underlying the work-supporting plate 49. The detent is normally spring-biased into elevated position and is adapted to be manually depressed into a stop-notch 112 cut into the adjusting element of the eccentric 92. When it is desired to adjust the stitch-length of the machine, the balance-wheel 40 is manually turned until the detent 85 on the bracket-arm 3 registers with the stop-notch 86 in the eccentric 78 of the needle-feed, in which position the detent is depressed and turned slightly, thereby locking the same in latching position. This leaves one hand of the operator free so that the detent 110 for the adjustable eccentric 92 upon the lower main-shaft 44 may be manually depressed while the balance-wheel 40 is turned with the other hand of the operator until the required amount of eccentricity has been obtained. To resume sewing, the detent 110 is released, as is also the detent 85. It is obvious from the above description that efficient means have been provided whereby the separate eccentrics for the needle-feed and lower feeding mechanism may be concomitantly adjusted to vary the eccentricities thereof. To facilitate the adjustment of the eccentrics to the proper stitch-length, there is fixed upon the arm-shaft 28 the stitch-length indicating disk 33 having inscribed on its periphery suitable indicia in position for convenient observation through an aperture (not shown) in the front wall of the bracket-arm 3.

*Looper mechanism*

The looper mechanism of the present machine is of the two-motion type and the looper is oscillated in a vertical plane parallel to the direction of feed about a normally fixed axis, the loop-seizing motion being in a direction opposite to the direction of the feed of the work through the machine. In the present disclosure, the looper mechanism comprises two loopers 113, see Figs. 1, 2, 4 and 8, each having a cylindrical shank 114 fixedly clamped by a screw 115 in a carrier 116. The carrier is formed with a shank 117 fastened by a tongue-and-groove connection and a clamping screw 118 to the face of an upstanding lug 119 formed integral with a supporting sleeve 120 freely journaled upon a fulcrum-rod 121. Clamped by means of a screw 122 upon the inner end-portion of the sleeve 120 is a split-strap 123 having formed integral therewith a transverse follower-sleeve 124 adapted to slidably receive the free end of a tubular pin 125. The tubular pin 125 at its other end is formed with a head 126 embracing a crank-pin 127 projecting from a crank 128 fixed upon the outer end of the lower main-shaft 44. The follower-sleeve 124 is preferably clamped upon the supporting sleeve 120 to provide means for adjusting the points of the loopers 113 toward and away from the needles 65, and also to adjust the paths of travel of the loopers laterally of the needles.

The looper actuating mechanism above described imparts to the loopers 113 a variable motion of such a character as to render the looper mechanism particularly applicable to a needle-feed machine.

In order to facilitate threading the loopers, means is provided whereby the loopers can be shifted to a point forwardly of the stitching point and to a lower level beneath the throat-plate 50. This means is best disclosed in Figs. 1, 2, 8 and 9. The supporting sleeve 120 is freely journaled upon the fulcrum-rod 121 and is adapted to be oscillated thereon by the crank 128 through the pin-and-sleeve connections 124 and 125. The fulcrum-rod 121 is provided at its opposite ends with enlarged eccentrically disposed portions 130 and 131, the latter of which is secured removably to the body of the fulcrum-rod 121 by the screws 132 for convenience in assembling the parts. The enlarged portion 131 is journaled in the dividing wall 9 of the bed and the enlarged portion 130 is formed with a reduced portion 133 having its longitudinal axis in alinement with the longitudinal axis of the enlarged portion 130, the reduced portion 133 being journaled in a bushing 134 fixed in the end-wall 7 of the bed. During normal sewing, the longitudinal axis of the fulcrum-rod 121 lies in the vertical plane containing the axes of the eccentrically disposed portions 131 and 133, this position being best shown in Figs. 2 and 8. When it is desired to retract the loopers for convenient threading the eccentrically disposed portions 131 and 133 are turned in a clockwise direction (Fig. 8) approximately 150 degrees about their longitudinal axes, thus swinging the fulcrum-pin 121, the supporting sleeve 120 and the looper carrier 119 into the position illustrated in dotted lines in Fig. 8. In this position the loopers are conveniently accessible for threading.

It will be observed that the fulcrum-rod 121 and its end-sections 130 and 131 are constructed for convenient assembly. The end-section 130 (Fig. 1) is formed with a portion 133 of reduced diameter providing a shoulder adapted to bear against the inner end-face of the bearing bushing 134, and mounted on the outer end of the reduced portion 133 is a disk 135 the inner face of which bears against the outer end-face of the bushing 134. The shoulder on the section 130 and the inner face of the disk 135 engage between them the opposite end-faces of the bearing bushing 134 and thereby effectively confine the fulcrum-rod 121 against endwise displacement.

Figure 9:
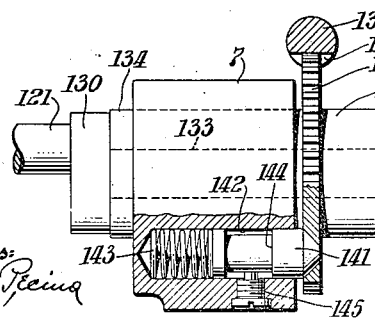
Fig. 9 is a view, partly in section, of the spring-biased detent for maintaining the loopers in their normal operative position.

Novel means is provided for turning the eccentrically disposed portions 131 and 133 about their longitudinal axes. This means comprises a disk 135 fastened upon the end of the reduced portion 133 of the fulcrum-rod 121 and having a section of its periphery formed with teeth 136 adapted to mesh with a rack 137 cut into the lower cylindrical surface of a retracting-rod 138 endwise shiftable in the end-wall 7. At its outer end the retracting-rod 138 is fitted with a knurled head 139, whereby it may be conveniently grasped by the hand of the operator. To limit endwise movement of the retracting-rod the latter is fitted with a stop-screw 140 which engages the inner end of the retracting-rod bearing provided in the end-wall 7 of the bed 1. Referring to Fig. 9, it will be observed that a spring-biased detent is employed to maintain the loopers in their proper operative position. This detent preferably includes a taper-headed plunger 141 seated in an aperture 142 in the end-wall 7 of the bed 1 and backed up by a coil-spring 143 which biases the tapered head of the plunger 141 into a suitable recess in the disk 135. To retain the plunger 141 in the aperture 142 during assembly, the body of the plunger is annularly recessed, as at 144, to receive the inner end of a screw 145 which limits endwise movement of the plunger 141.

From the above description it will be understood that the loopers are sifted into retracted position to facilitate the threading thereof by simply pulling the knurled head 139 of the retracting-rod 138 outwardly, thereby turning the disk 135 in a clockwise direction and swinging the fulcrum-rod 121 about the axes of the eccentrically disposed portions 131 and 133. The initial turning movement of the disk 135 depresses the spring-biased plunger 141, the end of the plunger bearing against the inner face of the disk 135 during the remainder of its turning movement. To reposition the loopers for sewing, the retracting-rod 138 is pushed inwardly until the plunger 141 enters its recess in the face of the disk 135 in which position the loopers are in their normal sewing relation.

Figure 2:
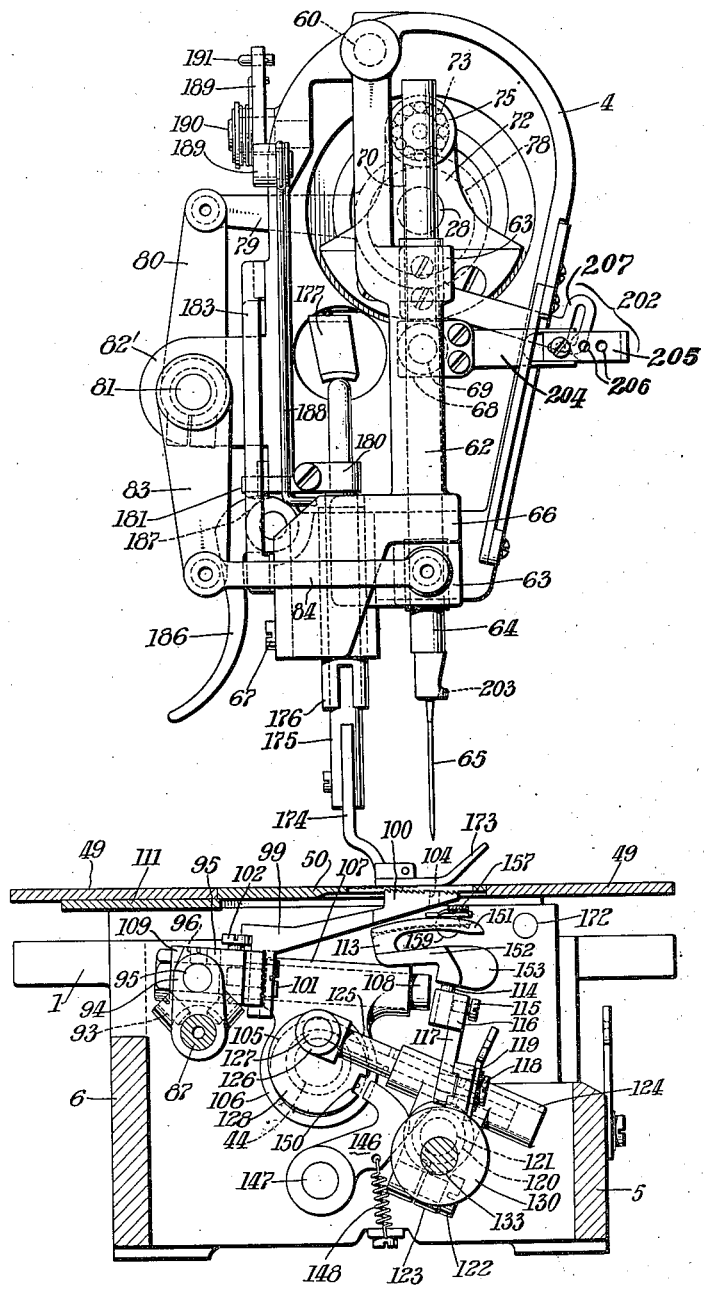
Fig. 2 is a front end elevation with the bed and work-supporting plate in section.
Figure 10:
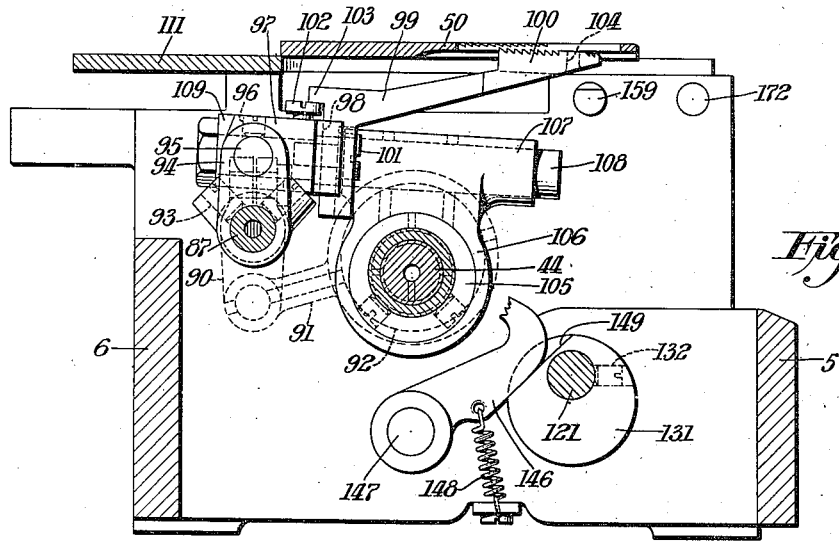
Fig. 10 is a transverse vertical sectional view taken substantially along the line 10—10, Fig. 4.

When the loopers are in retracted position, inadvertent operation of the machine would result in injury to various of the parts. To eliminate this danger a locking expedient is provided which prevents operation of the machine when the loopers are in retracted position. Referring to Figs. 1, 2 and 10, the locking expedient comprises a latch 146 fulcrumed freely upon the end-portion of a stationary rod 147 fixed in the dividing walls 9 and 10 of the bed 1. The latch 146, when the loopers are in operative position, is yieldingly maintained by a coil-spring 148 in contact with an inclined cam-surface 149, see Fig. 10, cut into the eccentrically disposed portion 131 of the fulcrum-rod 121. When the eccentrically disposed portion 131 is turned, under the action of the retracting-rod 138 when shifting the loopers into inoperative position, the latch 146 is swung about the longitudinal axis of the stationary rod 147 by the cam-surface 149 and the free end of the latch when in register with a stop-notch 150 in the looper-actuating crank 128, see Fig. 2, enters the same and locks the lower main-shaft 44 of the machine against rotation. The machine remains so locked until the loopers are shifted back into operative position.

Figures 13, 15:
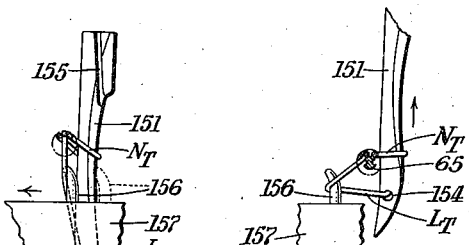
Fig. 13 is a view similar to Fig. 11, but showing the looper at the end of its loop-seizing stroke and the spreader engaging one limb of the looper-thread-loop preparatory to distending the same for entrance by the needle on its next work-penetrating stroke.
Fig. 15 is a view similar to Fig. 13, but showing the looper retracting to shed the needle-thread-loop and the looper-thread-loop fully distended by the spreader.
Figures 14, 16:
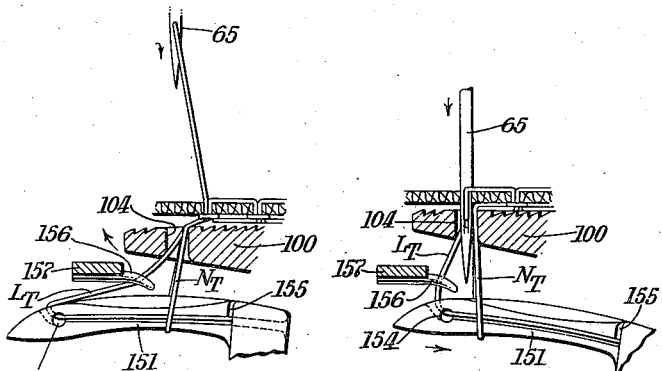
Fig. 14 is a right hand elevational view, partly in section of the elements shown in Fig. 13.
Fig. 16 is a right hand elevational view, partly in section of the elements shown in Fig. 15.

The loopers 113 used in the machine chosen for illustration are of special construction. Referring to Figs. 2, 13 and 14, it will be observed that each of the loopers 113 is substantially C-shaped. The upper limb of the looper constitutes the blade or needle-loop engaging portion 151, and the lower limb constitutes the body 152 from which extends a needle-guide 153 and the cylindrical looper-supporting shank 114. The blade 151 adjacent the beak thereof is formed with a thread-eye 154 which enters through the side-wall of the blade and emerges from the top of the blade, see Figs. 13 and 14. At the rear end of the blade there is provided a thread-slot 155 which opens into the top of the blade to facilitate the introduction of the looper-thread into the same when threading the looper. Extending from the body 152 of the looper is a needle-guide 153 which is so constructed that when the looper is disposed at the end of its loop-seizing stroke, the needle on its next work-penetrating stroke after passing through the needle-aperture 104 in the feed-dog 100 will engage the needle-guide 153 and remain in contact therewith during the feeding stroke of the needle and until the looper 113 again advances and seizes the thread-loop cast out by the needle during the initial part of its withdrawal stroke. The engagement of the needle-guide by the needle definitely positions the latter with respect to the advancing beak of the looper and insures that the needle-thread-loop will be seized by the looper, and that the needle will not be deflected into the path of the advancing looper-beak and consequently broken. In addition to the provision of the integral needle-guide, the particular formation of the thread-eye 154 so that it emerges from the top of the looper-blade instead of from the side thereof is advantageous in that it encourages the proper presentation of the looper-thread-loop $L_T$, Fig. 14, to a transversely reciprocatory spreader later to be described. The advantage of the novel arrangement of the thread-eye in the looper will be more fully discussed in connection with the spreader mechanism.

*Spreader mechanism*

To assist in stitch-formation, the two-motion loopers 113 each has cooperating therewith a spreader 156 which is adapted to distend the looper-thread to form the usual triangle with the previous needle-thread loop for entrance by the descending needle. The spreaders 156 are preferably rigidly fastened to a flat carrier-plate 157 adjustably secured at its ends upon alined endwise movable supporting rods 158 and 159. The supporting rod 158 is journaled in the end-wall 7 of the bed 1 and the supporting rod 159 is journaled in the dividing wall 9. Attached for endwise adjustment upon the other end of the supporting rod 159 is a head 160, Fig. 4, having a laterally projecting cross-pin 161 connected by a link 162 to the upper end of a rock-arm 163 integral with a transverse sleeve 164. This sleeve is preferably journaled upon a rod 165 fixed at its opposite ends in the walls 5 and 6 of the bed 1. Projecting horizontally from the sleeve 164 at the end remote from the rock-arm 163 is a second rock-arm 166 in the form of a short rod supporting a ball 167 adapted to be received in a split socket 168 provided in the upper end of a relatively short pitman 169 actuated by an eccentric 170 secured upon the lower main-shaft 44. To steady the carrier-plate 157 and prevent the same from turning about the axes of the supporting rods 158 and 159, the free end of the cross-pin 161 is adapted to slide in a guide-slot 171 cut into the end of the rod 172 fixed in the dividing wall 9.

Figure 11:
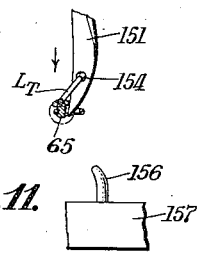
Fig. 11 is a fragmentary top plan view of the looper and spreader, illustrating the looper just entering the needle-thread-loop during the loop-seizing stroke of the needle.
Figure 12:
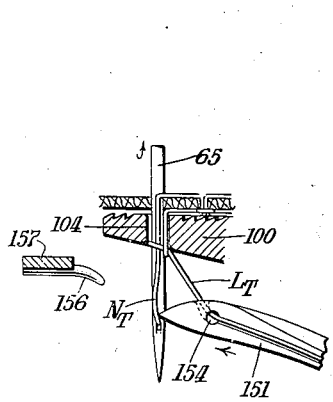
Fig. 12 is a right hand elevational view, partly in section of the elements shown in Fig. 11.

The eccentric 170 is timed so that the spreader 156 is reciprocated crosswise of the line of seam formation at the proper time to spread the thread leading from the looper-eye to form the usual thread triangle with the previous needle-loop which is about the blade of the looper for proper entrance by the descending needle. The functioning of the spreader 156 is illustrated in Figs. 11 to 16, inclusive. In Figs. 11 and 12, the needle 65, after reaching the lowermost point of its stroke, has begun its ascending stroke and has cast out a thread-loop $N_T$ which is just being entered by the beak of the looper 151. During this part of the stitch-forming cycle, the spreader 156 does not perform any useful function. Figs. 13 and 14 disclose the looper at the end of its loop-seizing stroke and the needle 65 at the highest point of its stroke. It will be seen that the spreader 156 has engaged a limb of the looper-thread $L_T$ and is preparing to carry said limb to a position further to the left. Figs. 15 and 16 disclose the looper 151 retracting to shed the needle-thread-loop $N_T$, the needle 65 descending to enter the thread triangle and the spreader 156 at the end of its loop-distending stroke.

It will be observed from Figs. 11 to 16, inclusive, that the spreader 156 materially aids in the formation of the stitches and that should the spreader, for any reason, fail to engage and distend the looper-thread $L_T$, proper stitch-formation will fail. In a needle-feed machine, wherein the usual needle aperture is not stationary but is formed in the feed-dog and shifts back and forth in the line of feed, it has been found desirable to form the looper with a thread-eye entering the side of the looper-blade and emerging from the top of the looper-blade adjacent the beak. In the preferred construction of the looper, as shown in Figs. 11 to 16, inclusive, the vertical face adjacent the looper-beak terminates at its upper edge into a flat, substantially horizontal, top surface. The thread-eye or duct 154 enters through the vertical face and emerges from the flat top and is formed so that for a portion of its length adjacent the delivery end the thread-duct 154 extends into the looper-blade in a vertical plane. It is desirable to so construct the looper, because, as shown in Figs. 13 and 14, when the spreader 156 moves to engage the limb of the looper-thread $L_T$, the feed-dog 100 is moving to the left. This movement of the feed-dog creates slack in the limb of the looper-thread $L_T$ which is to be engaged by the spreader 156, rendering the limb of thread uncontrolled and susceptible of falling out of range of the spreader 156. By arranging the thread-eye so that it emerges from the top of the looper with a portion of the body of the thread-eye extending substantially vertically into the looper-blade or, in other words, in a direction normal to the line of movement of the beak of the spreader 156, the lead of the looper-thread from the thread-eye to the previous stitch in the work is such that it is practically impossible for the limb of the looper-thread $L_T$ to fall outside of the range of the spreader. Moreover, it permits the carrier-plate 157 which supports the spreader 156 to be positioned a greater distance in advance of the needles than would otherwise be practical, thus allowing a feeding mechanism to make a longer stitch.

*Presser-foot lifting mechanism*

Opposed to the feed-dog 100 is the usual presser-foot 173, Figs. 2 and 3, having a shank 174 secured to the lower end of a relatively short presser-bar 175 journaled in a bushing 176 fixed in the machine-head 4. At its upper end the presser-bar 175 is engaged by the free end of a leaf-spring 177 secured at its other end by a screw 178 to the bracket-arm 3. The tension of the leaf-spring is regulated by an adjusting screw 179 threaded into the bracket-arm 3. Clamped upon the presser-bar 175 adjacent its upper end is a split-collar 180 formed with a rearwardly extending and laterally disposed guide-arm 181, the free end of which extends into a guide-slot 182 defined by two parallel arranged members 183 and 184 secured at their opposite ends by screws 185 to the machine-head 4. The guide-arm 181, in addition to preventing the presser-bar 175 from turning in the bushing 176, overlies the usual hand-controlled presser-foot lifting lever 186 pivotally mounted upon a lug 187 integral with the machine-head 4.

Treadle-controlled means is also provided for raising and lowering the presser-foot. Underlying the presser-bar guide-arm 181 is the bent lower end of a depending wire link 188 pivoted at its upper end upon one arm of an angle-lever 189 fulcrumed upon a stud 190 on the machine-head 4. Connected to the other limb of the angle-lever 189 is one end of a horizontal wire-link 191 whose other end is connected to a lever arm 192 fulcrumed upon a stud 193 on the bracket-arm 3. Formed integral with the hub of the lever-arm 192 is an inclined block 194 channeled to detachably receive an actuating lever 195 connected by a chain 196 to a suitable treadle or knee-shift mechanism not shown.

In order that the needle-thread may be relieved of its tension when the presser-foot is raised, the lever-arm 192 has adjustably secured thereto a cam-element 197 which is adapted to engage the end of a tension-releasing pin 198, Fig. 6, and shift the same endwise in opposition to a coil-spring 199. The endwise movement of the releasing pin 198 separates the tension-disks 200 of the usual tension device 201 supported upon the front wall of the bracket-arm 3.

*Thread-handling mechanism*

The mechanism of the present machine for controlling the needle-thread $N_T$ is substantially the same as that disclosed in my U. S. Patent No. 2,266,140, issued Dec. 16, 1941. The thread $N_T$ traveling from the supply passes first through the tension 201, a conventional nipper not shown but actuated intermittently by the cam 31 on the arm-shaft 28, thread-controller 202, thread-guide 203, and finally to the eye of the needle 65. The tension 201 is of conventional design and is operated as described in the previous section entitled "Presser-foot lifting mechanism." The nipper used in the present machine is identical with that disclosed in my patent above referred to.

From the nipper, the thread $N_T$ is led to the thread-controller 202 which comprises an arm 204 secured upon the split-collar 68 to which is connected the needle-bar link 70. To the free end of the arm 204 there is fastened a U-shaped member 205 having formed therein a plurality of thread-eyes 206. Operating between the two limbs of the U-shaped member 205 is a thread-controlling arm 207 secured for limiting adjustment uupon the needle-bar link 70. It will be understood from Fig. 2 that the arm 204 supporting the thread-eyes 206 and the thread-controlling arm 207, as a result of the way in which each is supported, have a differential action relative to each other, which action effects a periodic take-up of the needle-thread $N_T$. The action of this thread-controller 202 is more fully described in my patent above referred to.

Figure 7:
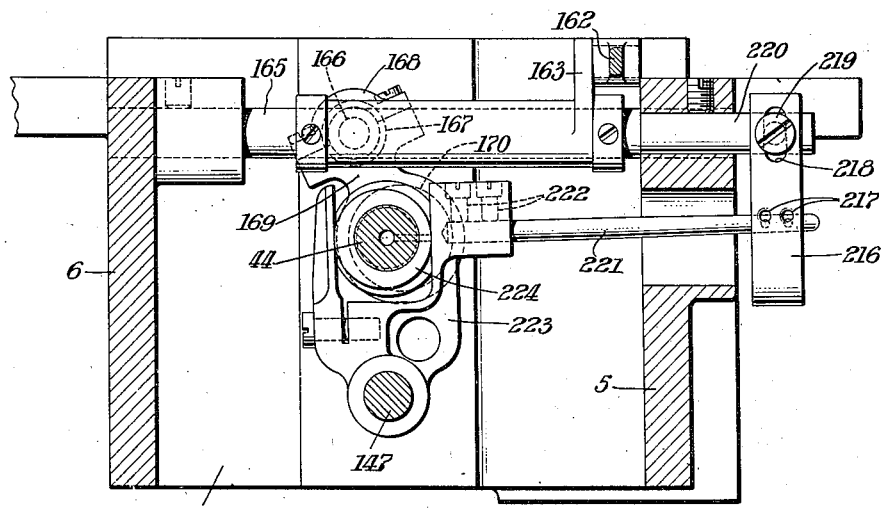
Fig. 7 is an enlarged transverse vertical sectional view taken substantially along the line 7—7, Fig. 4.
Figure 8:
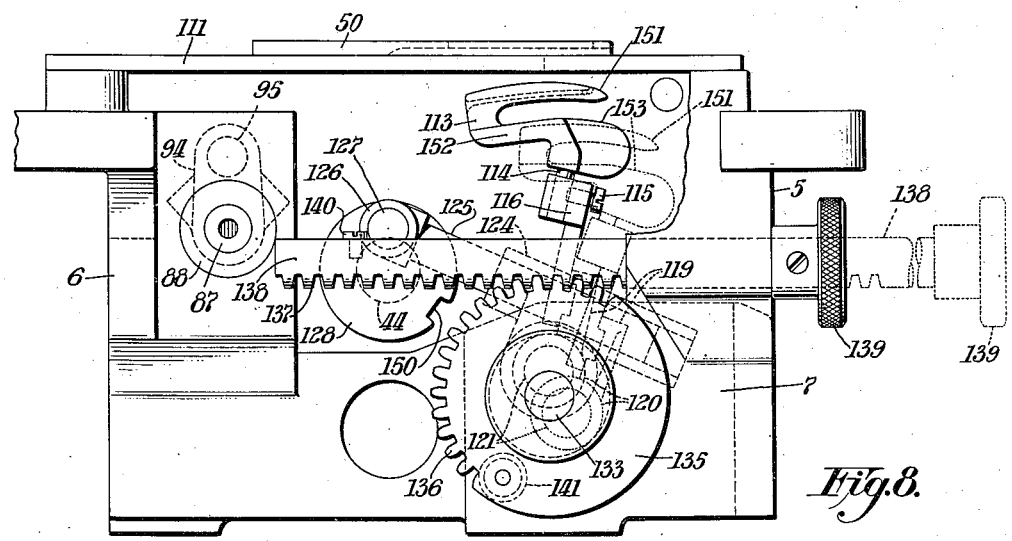
Fig. 8 is an enlarged front end elevation of the bed, showing the loopers in their operative position in full lines and in their retracted or threading position in dotted lines.

The control of the looper-thread $L_T$ from any suitable supply is accomplished as illustrated in Figs. 4, 5 and 7. Referring to Fig. 4, the looper-thread $L_T$ passes through a thread-guide 208 secured to the bottom of the rear wall of the standard 2, then through a passageway 209 beneath the work-supporting plate 49 and between the dividing wall 10 and the standard 2 to a "self-threading" thread-guide 210, then through a conventional tension device 211 to a thread take-up 212, thence through thread-guides 213, 214 and 215 to the looper 113. The take-up 212, best illustrated in Figs. 4 and 7, comprises a stationary depending U-shaped member 216 formed in each limb with thread-eyes 217, one of the limbs being slotted at its upper end, as at 218, to receive a fastening screw 219 threaded into a supporting rod 220 fixed in the wall 5 of the bed 1. Vibrating between the limbs of the U-shaped member 216 is the free end of a take-up arm 221 whose other end is secured by screws 222 in the frame 223 fulcrumed at its lower end upon the stationary rod 147 fixed in the walls 9 and 10 of the bed 1. The frame 223 is forked to embrace an eccentric 224 on the lower main-shaft 44, whereby the free end of the take-up arm 221 is vibrated between the limbs of the U-shaped member in time to properly control the looper-thread $L_T$.

*Lubrication*

In order that the machine may be operated at high speed there is provided a lubricating system which is manually controlled to distribute oil under pressure to various bearings in the machine. The lubricating system illustrated forms the subject of my co-pending divisional application Serial No. 362,906, filed Oct. 26, 1940. In the machine chosen for illustration, Figs. 1 and 6, there is provided within the standard 2 a suitable pump 225 fitted with an inlet pipe 226 and two outlet pipes 227 and 228, pipe 227 supplying oil to the mechanism within the bed 1 and pipe 228 supplying oil to the mechanisms within the bracket-arm 3 and head 4.

Referring to Fig. 1, one wall of the standard 2 is preferably formed with a lug 229 apertured to receive a supporting extension 230 integral with the housing of the pump 225. The pump is preferably of the plunger type and comprises a cylinder 231 fitted with a piston 232 fastened upon the end of a rod 233 slidably journaled in a head 234 vented as at 235 and threaded upon the cylinder 231. The exposed end of the piston-rod 233 is equipped with a knurled head 236 which is normally disposed within a cavity 237 formed in the cover-plate 18 which closes the open face of the standard 2. The pump at the base of the cylinder 231 is formed with a chamber 238 having an inlet port 239 and two outlet ports 240 and 241. Each of the three ports is opened and closed automatically by a ball 242 active in response to pressure created by the manual actuation of the piston 232.

The inlet port 239 of the pump 225 is connected by the pipe 226 to lubricant reservoir 14 in the bed 1, Fig. 6. The two outlet ports 240 and 241 of the pump 225 are connected by pipes 227 and 228 to the lower main-shaft 44 and the arm-shaft 28, respectively. The lower end of the outlet pipe 227 is received in the upper end of a hole 243 in the end-wall 8 of the bed 1. The lower end of the hole 243 registers with an annular groove 244 formed in the periphery of the rotatable collar 245 fixed upon the lower main-shaft 44. The oil supplied under pressure to the annular groove 244 by the pump 225 is led through a radial duct 246 in the collar 245 to an annular groove 247 in the periphery of the main-shaft 44 and from said groove through the radial duct 248 into the longitudinal bore 249 in the main-shaft 44. In this manner oil is conducted to the shaft-bore 249 which is closed at its opposite ends, the oil in the bore being dispersed to the various needle-bearings 41, 42 and 43, the eccentrics 92, 105 and 170, the crank-pin 127 and tubular pin 125 for actuating the looper mechanism, and the pin-and-sleeve connection 107 and 108 for raising and lowering the feed-dog 100 through a series of small radial ducts 250 in the main-shaft 44.

The upper end of the second outlet pipe 228 has secured thereto a commercial fitting 251 threaded into a boss 252 integral with the internal partition 20 adjacent the balance-wheel end of the bracket-arm 3. In alinement with the fitting 251 the boss 252 is formed with a port 253 of which the upper end is in register with an annular groove 254 cut into the rotatable collar 37 fixed upon the arm-shaft 28. From the annular groove 254 the oil is led through a duct 255 into an annular groove 256 in the periphery of the arm-shaft 28 into the bore 258 of the arm-shaft. As in the lower main-shaft 44, the oil in the bore 258 is dispersed to the needle-bearings 26 and 29, the ball-bearing 27, the needle-bar vibrating eccentric 78, and to the needle-bar reciprocating mechanism through a series of small radial ducts 259 in the arm-shaft 28. In Fig. 1, it will be observed that oil is conducted to the balls in the ball-bearing 27 by means of a disk 260 fixed to rotate with the arm-shaft 28 and having its inner face in position to receive oil from the end of the radial duct 259. During rotation of the arm-shaft, the oil collected on the face of the disk 260 is thrown to the outer inturned edge thereof and is directed between the raceways and onto the balls in contact therewith. Excess oil from the mechanism within the compartment 23 in the bracket-arm 3 is returned to the lubricant-reservoir 14 by means of a return pipe 261.

The needle-bar reciprocating mechanism is lubricated in a manner clearly shown in Fig. 1. The oil in the arm-shaft bore 258 is delivered by the small radial duct 259 to the inner end of a port 262 formed in the needle-bar crank 72. The outer end of the port 262 intercepts the hollow bore of the crank-pin 71. As previously described, this bore receives the stud 74 having a shank formed with the reduced section 76 providing a passageway for distributing the oil supplied by the port 262 to the needle-bearings 73 and to the bearing surface between the needle-bar pin 69 and the actuating link 70 through the bore of the latter. The stud is retained in the bore of the crank-pin 71 by the set-screw 77 which closes the outer end of the bore 262 in the crank 72.

It can be understood from the above description taken in connection with the accompanying drawings, that I have provided a sewing machine lubricating mechanism which is designed to deliver oil under pressure to the various bearing points in the machine requiring lubrication at intervals, or whenever the bearings are in need of lubrication, and that the pressure of the oil depends upon the force applied by the operator to the piston 232. It will be seen that by manually reciprocating the pump-piston 232, oil will be distributed under pressure to the bore of both the upper and the lower shafts 28 and 44, respectively, and that the oil then is conducted to the various bearings by radial ducts. These radial ducts are purposely made of such a diameter that a sufficient quantity of oil will be delivered to each bearing, and also small enough so that the system will be maintained filled with oil, thereby to eliminate the formation of air-pockets in the systems. In the embodiment chosen to illustrate my invention, the pump 225 employed is of the well known plunger type which is adapted to be manually actuated by the operator whenever it is necessary to lubricate the machine. It is to be understood that any suitable type of pump may be substituted for the plunger-pump disclosed, and that automatic means may be used to actuate the pump at the end of a predetermined number of stitches.

Having thus set forth the nature of the invention, what I claim herein is:

1. A sewing machine looper mechanism comprising, a thread-carrying looper; an oscillatory looper-carrier journaled upon a shiftable fulcrum-rod; means for imparting loop-seizing and -shedding motions to said looper about said fulcrum-rod; and means including a toothed disk and mechanism in cooperative meshing relation therewith for shifting said fulcrum-rod to carry the looper from sewing position to a more readily accessible threading position.

2. A sewing machine looper mechanism comprising, a thread-carrying looper; an oscillatory looper-carrier journaled upon a shiftable fulcrum-rod having end-sections whose axes are eccentrically located with respect to the axis of the fulcrum-rod; means for imparting loop-seizing and -shedding movements to the looper about said fulcrum-rod; a toothed-disk mounted upon one of the end-sections of said fulcrum-rod; and a retracting-rod in mesh with said toothed-disk for shifting said fulcrum-rod to carry the looper to a position facilitating threading thereof.

3. A sewing machine looper mechanism comprising, a thread-carrying looper having an operative and a threading position; an oscillatory looper-carrier journaled upon a shiftable fulcrum-rod; means for imparting loop-seizing and -shedding movements to said looper about said fulcrum-rod; means including a toothed-disk and a cooperating retracting-rod for shifting said fulcrum-rod to carry the looper from one to the other of its positions; and a detent for maintaining the looper in its operative position.

4. A sewing machine looper mechanism comprising, a thread-carrying looper having an operative and a threading position; an oscillatory looper-carrier journaled upon a shiftable fulcrum-rod; means for imparting loop-seizing and -shedding movements to said looper about said fulcrum-rod; means including a toothed-disk and a cooperating retracting-rod for shifting said fulcrum-rod to carry the looper from one to the other of its positions; a detent for maintaining the looper in its operative position, and a locking device for precluding the operation of the looper mechanism while the looper is in threading position.

5. A sewing machine looper mechanism comprising, a thread-carrying looper having an operative and a threading position; an oscillatory looper-carrier journaled upon a shiftable fulcrum-rod having end-sections whose axes are eccentrically located with respect to the axis of the fulcrum-rod; means including a crank for imparting loop-seizing and -shedding movements to the looper about said fulcrum-rod; means for shifting said fulcrum-rod to carry the looper into threading position; and a locking device for precluding the operation of the looper mechanism while the looper is in threading position, said locking device including a latch adapted to enter a stop-notch in said crank when the looper is shifted to its threading position.

6. A sewing machine looper mechanism comprising, a thread-carrying looper having an operative and a threading position; an oscillatory looper-carrier journaled upon a shiftable fulcrum-rod having end-sections whose axes are eccentrically located with respect to the axis of the fulcrum-rod; means including a crank for imparting loop-seizing and -shedding movements to the looper about said fulcrum-rod; means for shifting said fulcrum-rod to carry the looper into threading position; and a locking device for precluding the operation of the looper mechanism while the looper is in threading position, said locking device including a pivotal latch, a cam-surface formed in one of the end-sections of said fulcrum-rod for engaging said latch and swinging the same into a stop-notch formed in said crank when the fulcrum-rod is shifted to carry the looper into its threading position, and a spring for disengaging the latch from said stop-notch when the looper is returned to its operative position.

7. In a sewing machine; the combination with feeding mechanism; and a reciprocatory needle; of a thread-carrying looper substantially parallel to the line of feed and having an operative and a threading position; a looper-carrier journaled upon a shiftable fulcrum-rod normal to the line of feed; a looper-driving shaft normal to the line of feed and connected to impart a variable motion to said looper; a toothed-disk operatively connected to said fulcrum-rod; and a retracting-rod journaled in said bed substantially parallel to the line of feed and provided with a rack in mesh with said toothed-disk for shifting the looper from one to the other of its positions.

8. The combination with a reciprocating needle; of a thread-carrying looper; an oscillatory supporting sleeve carrying said looper and journaled upon a fulcrum-rod; a looper-driving shaft; an actuating crank fixed on said looper-driving shaft; a transverse follower sleeve frictionally clamped on said supporting sleeve; and a pin endwise slidable in said follower-sleeve and operatively connected to said crank for imparting a variable motion to said looper.

9. In a sewing machine the combination with an endwise reciprocatory needle; of a thread-carrying looper having a blade terminating in a loop-seizing beak, said blade being provided with a thread-eye entering through the side of said blade and emerging from the top of said blade; and a loop-spreader adapted to engage the looper-thread adjacent the top of the looper-blade and position the same so that the needle will pass into the looper-thread loop on its succeeding stroke.

10. A chain-stitch thread-carrying looper comprising a body-section fitted with a shank adapted to be received in a looper-carrier; and a blade terminating in a loop-seizing beak and formed adjacent said beak with a substantially vertical face and a substantially horizontal top, said blade being provided with a thread-eye entering through the vertical face thereof and emerging from the horizontal top thereof.

11. A chain-stitch thread-carrying looper comprising a substantially C-shaped body-section; one of the limbs of said body-section being provided with a shank; and the other of the limbs of said body-section providing a blade terminating in a loop-seizing beak, said blade being formed with a thread-eye entering through the side of said blade and emerging from the top of said blade.

12. A chain-stitch thread-carrying looper comprising a substantially C-shaped body-section having one of the limbs thereof provided with a shank and a needle-guide and the other of the limbs thereof forming a blade terminating in a loop-seizing beak, said blade being equipped with a thread-eye entering through the side of said blade and emerging from the top of said blade.

13. A chain-stitch thread-carrying looper comprising; a body-portion fitted with a shank adapted to be received in a looper-carrier; and a blade terminating in a loop-seizing beak and formed adjacent said beak with a thread-duct emerging from the top of said blade, said thread-duct having a portion of its length adjacent its delivery and extending substantially vertically into the looper-blade.

14. A sewing machine having, in combination, a thread-carrying looper having an operative and a threading position; a carrier therefor; a fulcrum-rod on which said carrier is journaled having spaced eccentrically disposed alined sections about which the fulcrum-rod is manually turned, one of said sections having a portion of reduced diameter providing a shoulder; a bearing bushing in which the reduced portion of said section is journaled and against one of its end-faces said shoulder is adapted to bear; a member mounted on the end of the reduced portion of said section opposite to said shoulder and adapted to bear against the other end-face of said bushing to confine the fulcrum-rod against endwise displacement; manually operable means operatively connected to said member for turning said fulcrum-rod about the axes of said alined sections to carry the looper from operative position into threading position; and means for imparting loop-seizing and -shedding movements to said looper about said fulcrum-rod.

15. A chain-stitch thread-carrying looper adapted for use in a chain-stitch sewing machine having an actuated spreader movable in a predetermined path; comprising; a body-portion fitted with a shank adapted to be received in a looper-carrier; and a blade terminating in a loop-seizing beak and formed adjacent said beak with a thread-duct having a portion of its length adjacent its delivery end extending into the looper-blade in a direction substantially normal to the line of movement of the spreader-beak when the latter is advancing to seize the looper-thread loop.

FREDERICK F. ZEIER.

CERTIFICATE OF CORRECTION.

Patent No. 2,312,858.　　　　　　　　　　　March 2, 1943.

FREDERICK F. ZEIER.

It is hereby certified that error appears in the printed specification of the above numbered patent requiring correction as follows: Page 2, first column, line 14, for "partitions 28" read --partitions 20--; page 3, first column, line 59, after "feed-rocker 94" insert --having--; page 4, second column, line 27, for "sifted" read --shifted--; page 6, first column, line 72, for "uupon" read --upon--; and that the said Letters Patent should be read with this correction therein that the same may conform to the record of the case in the Patent Office.

Signed and sealed this 6th day of April, A. D. 1943.

(Seal)　　　　　　　　　　　　　　　　Henry Van Arsdale,
　　　　　　　　　　　　　　　　Acting Commissioner of Patents.